US006795209B1

(12) United States Patent
Patton et al.

(10) Patent No.: US 6,795,209 B1
(45) Date of Patent: Sep. 21, 2004

(54) METHOD AND APPARATUS FOR MODIFYING A HARD COPY IMAGE DIGITALLY IN ACCORDANCE WITH INSTRUCTIONS PROVIDED BY CONSUMER

(75) Inventors: David L. Patton, Webster, NY (US); Anne E. Bohan, Pittsford, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/418,560

(22) Filed: Oct. 14, 1999

(51) Int. Cl.[7] .............................. G06F 15/00; G06K 9/60
(52) U.S. Cl. ...................... 358/1.18; 358/500; 358/451; 382/306; 382/312
(58) Field of Search ................................ 358/1.18, 452, 358/451, 500, 501, 296; 707/539; 355/40, 112, 41; 382/163, 306, 312; 347/3, 107

(56) References Cited

U.S. PATENT DOCUMENTS

| 3,444,517 A | * | 5/1969 | Rabinow ..................... 76/105 |
|---|---|---|---|
| 4,503,468 A | | 3/1985 | Serinken et al. ............ 358/452 |
| 4,538,183 A | * | 8/1985 | Kanno et al. ............... 358/452 |
| 4,965,678 A | | 10/1990 | Yamada ...................... 358/452 |
| 4,987,849 A | * | 1/1991 | Sherman ..................... 116/206 |
| 5,016,096 A | | 5/1991 | Matsunawa et al. ........ 358/538 |
| 5,075,787 A | | 12/1991 | Shaughnessy et al. ...... 358/452 |
| 5,175,426 A | * | 12/1992 | Chuan-Yu ................ 250/208.1 |
| 5,301,044 A | * | 4/1994 | Wright ...................... 358/500 |
| 5,335,095 A | | 8/1994 | Kageyama et al. ......... 358/500 |
| 5,360,235 A | | 11/1994 | Drummeter et al. ......... 283/89 |
| 5,406,389 A | | 4/1995 | Hasegawa et al. .......... 358/452 |
| 5,552,900 A | | 9/1996 | Someya ..................... 358/452 |
| 5,668,636 A | | 9/1997 | Beach et al. |
| 5,671,277 A | | 9/1997 | Ikenoue et al. |
| 5,675,400 A | | 10/1997 | Stephenson, III ............ 355/40 |
| 5,745,248 A | | 4/1998 | Nickerson ................... 358/296 |
| 5,892,596 A | | 4/1999 | Nonaka et al. ............. 358/538 |
| 6,333,499 B1 | * | 12/2001 | Sato .......................... 250/234 |
| 6,354,630 B1 | * | 3/2002 | Zhang et al. ................. 283/70 |
| 6,408,428 B1 | * | 6/2002 | Schlansker et al. .......... 716/17 |

* cited by examiner

Primary Examiner—Twyler Lamb
(74) Attorney, Agent, or Firm—Frank Pincelli

(57) ABSTRACT

A system and method for editing an image provided on a hard copy print. The system includes a marking device for placing an instruction indicia on the hard copy print for modifying the image; and a scanning device for reading the instruction indicia and the image. A template may be provided for use in providing instruction indicia on a hard copy print.

41 Claims, 8 Drawing Sheets

METHOD AND APPARATUS FOR MODIFYING A HARD COPY IMAGE DIGITALLY IN ACCORDANCE WITH INSTRUCTIONS PROVIDED BY CONSUMER

FIELD OF THE INVENTION

The present invention relates to modifying images for use in producing hard copy prints in accordance with instructions provided by a customer.

BACKGROUND OF THE INVENTION

Many customers would like to modify their images on hard copy prints, negatives, etc. before they have reprints made. The modifications include changes such as cropping, enlarging the cropped area, removal of unwanted items appearing in the scene, elimination of red eye, and changing the skin tone to mention a few. Currently the customer has several options of conveying the modifying instructions to the photofinisher. They can write the instructions and send the instructions with the negative or print to the photofinisher. The customer can also use a device such a KODAK Create-A-Print or Print Maker for making reprints and make the changes themselves, or scan their hard copy image and use a computer with a digital editing software program such as Photo Shop to make the changes. Of these methods the first, writing the instructions, is the simplest, but written instructions are very often misinterpreted and require the intervention of a skilled operator who then has to make judgements based on how he or she interprets the instructions. The remaining options require the customer to seek out a device where he or she can do the modifications to the hard copy image themselves or they have to be skilled in digital editing.

It is also known that algorithms can be used for automatically correcting such things as red eye or for changing skin tones in digital images. However, these algorithms may miss areas to be modified.

In a system made in accordance with the present invention a solution is provided for eliminating and/or minimizing the problems of the prior art that can improve how customers provide information to the photofinisher to modify their hard copy prints for reprinting digitally.

SUMMARY OF THE INVENTION

According to one aspect of the present invention, there is provided a system for editing an image provided on a hard copy print, comprising:

a marking device for placing an instruction indicia on the hard copy print which is non-visible under normal viewing conditions, the instruction indicia providing instructions for modifying the image; and a scanning device for reading the instruction indicia and the image, the scanning device includes an algorithm for separating the image from the instruction indicia.

In accordance with another aspect of the present invention there is provided a system for editing an image provided on a hard copy print, comprising:

a marking device for placing an instruction indicia on the hard copy print which is non-destructive to the hard copy print, the instruction indicia identifying instructions for modifying the image; and a scanner for scanning the instruction indicia and the image so as to obtain digital data of the image and the instructional indicia.

In accordance with another aspect of the present invention there is provided a system for editing an image provided on a hard copy print, comprising:

a sleeve for holding the hard copy print, the sleeve being constructed so as to allow the image on the hard copy print to be scanned for obtaining a digital record of the image;

a marking device for placing an instruction indicia on the sleeve for identifying instructions for modifying the image; and a scanner for scanning the instruction indicia and the image on the hard copy print so as to obtain digital data of the image and instruction indicia.

In accordance with yet another aspect of the present invention there is provided a system for editing an image provided on a hard copy print, comprising:

a scanner for scanning the image on the hard copy print so as to obtain digital data of the image;

a computer for receiving the digital data of the image;

a display device for displaying the image obtained by the scanner which was forwarded to the computer; and an electronic data entering device for entering instructional indicia for modifying the image, the instruction indicia representing programmed instructions provided in the computer for automatically modifying of the image.

In accordance with another aspect for the present invention there is provided a system for editing an image provided on a hard copy print, comprising:

a marking device for placing an instruction indicia on the hard copy print which is non-visible under normal viewing conditions, said instruction indicia providing instructions for modifying the image, the marking device comprises a marker using an ink which fades to transparent over a brief period of time; and a scanning device for reading the instruction indicia and the image.

In accordance with another aspect of the present invention there is provided a system for editing an image provided on a hard copy print, comprising:

a marking device for placing an instruction indicia on the hard copy print which is non-visible under normal viewing conditions, said instruction indicia providing instructions for modifying the image, the hard copy print has been treated to provide a protective layer over the image; and a scanning device for reading the instruction indicia and the image.

In accordance with still another aspect of the present invention there is provided a system for editing an image provided on a hard copy print, comprising:

a marking device for placing an instruction indicia on the hard copy print which is non-visible under normal viewing conditions, the instruction indicia providing instructions for modifying the image; and a scanning device for reading the instruction indicia and the image, the scanning device comprises a single scanning device for scanning the image and the instruction indicia in a single pass.

In yet another aspect of the present invention there is provided a system for editing an image provided on a hard copy print, comprising:

a marking device for placing an instruction indicia on the hard copy print which is non-visible under normal viewing conditions, the instruction indicia providing instructions for modifying the image; and a scanning device for reading the instruction indicia and the image, the scanning device comprises a first and second scanning device, the first scanning device capable of identifying the image and the second scanning device capable of recognizing the instruction indicia.

In still another aspect of the present invention there is provided a system for editing an image provided on a hard copy print, comprising:

a marking device for placing an instruction indicia on the hard copy print which is non-visible under normal viewing conditions, the instruction indicia providing instructions for modifying the image;

a scanning device for reading the instruction indicia and the image; and a template for use in providing the instruction indicia on the hard copy print.

In yet another aspect of the present invention there is provided a system for editing an image provided on a hard copy print, comprising:

a marking device for placing an instruction indicia on the hard copy print which is non-visible under normal viewing conditions, the instruction indicia providing instructions for modifying the image, the hard copy print further comprising a protective barrier for placement on the hard copy print upon which the instruction indicia may be provided; and a scanning device for reading the instruction indicia and the image.

In another aspect of the present invention there is provided a system for editing an image provided on a hard copy print, comprising:

a marking device for placing an instruction indicia on the hard copy print which is non-visible under normal viewing conditions, the instruction indicia providing instructions for modifying the image;

a scanning device for reading the instruction indicia and the image; and a kiosk having a supporting platen upon which the hard copy print may be placed and a protective barrier which can be placed over the image upon which the instruction indicia may be provided, the cover having orientation marks, the scanner capable of scanning the image and marking thereon.

In accordance with yet another aspect of the present invention there is provided a method for editing an image on a hard copy print, comprising the steps of:

providing an instruction indicia on the hard copy print which is not visible under normal viewing conditions, the instruction indicia comprising instructions for modifying of the image;

scanning the hard copy print so as to read the instruction indicia and obtain digital image data representative of the image; and providing additional instructions using a data entry device.

In accordance with another aspect of the present invention there is provided a method for editing an image on a hard copy print, comprising the steps of:

providing an instruction indicia on the hard copy print which is not visible under normal viewing conditions, the instruction indicia comprising instructions for modifying of the image;

scanning the hard copy print so as to read the instruction indicia and obtain digital image data representative of the image in a single step.

In yet another aspect of the present invention there is provided a method for editing an image on a hard copy print, comprising the steps of:

providing an instruction indicia on the hard copy print which is not visible under normal viewing conditions, the instruction indicia comprising instructions for modifying of said image;

scanning the hard copy print so as to read the instruction indicia and obtain digital image data representative of the image; wherein scanning comprises the use of two separate scanners.

In another aspect of the present invention there is provided a method for editing an image on a hard copy print, comprising the steps of:

providing an instruction indicia on said hard copy print which is not visible under normal viewing conditions, the instruction indicia comprising instructions for modifying of the image;

scanning the hard copy print so as to read the instruction indicia and obtain digital image data representative of the image; wherein scanning comprises the step of scanning the hard copy image twice wherein the image is obtained by scanning the hard copy image in two steps.

In accordance with yet another aspect of the present invention there is provided a method for editing an image on a hard copy print, comprising the steps of:

a) providing an instruction indicia on the hard copy print which is not visible under normal viewing conditions, the instruction indicia comprising instructions for modifying of the image; and b) scanning the hard copy print so as to read the instruction indicia and obtain digital image data representative of the image, the digital image data and the instructions are obtained by a single scanning step.

In another aspect of the present invention there is provided a template for use in providing instruction indicia on a hard copy print having an image using a marker, providing marks which are not normally visible under normal viewing conditions, the template comprising:

a generally planar support structure having at least one cut-out out for use in placing an indicia of a predetermined configuration, the indicia identifying a particular function or code for modifying the image.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
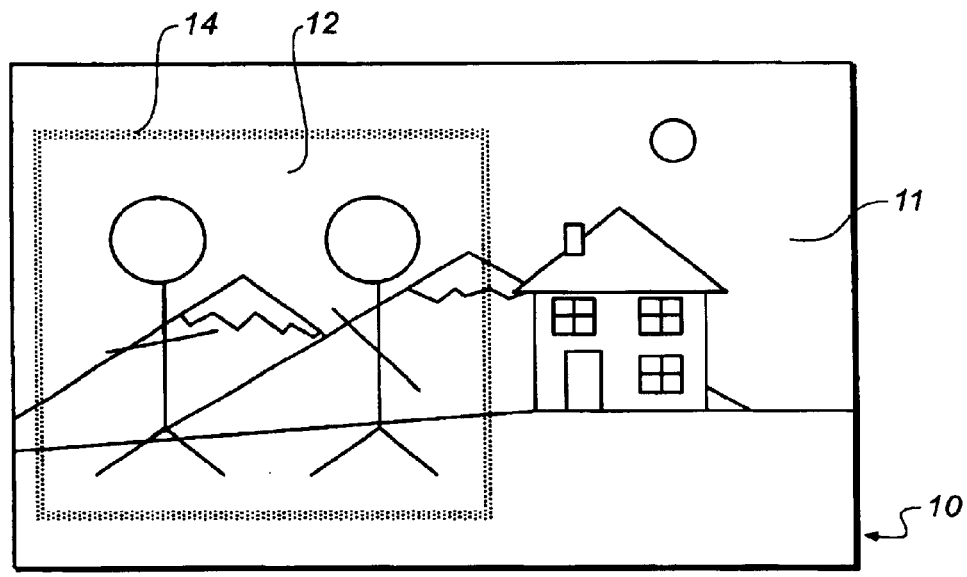
FIG. 1 illustrates a hard copy image with the area to be cropped marked.

Referring to FIG. 1, there is illustrated a hard copy print 10 having an image 11 thereon with the area 12 of the image 11 to be cropped marked. In the particular embodiment illustrated the print 10 is a photographic print, however, the print may be any other hard copy media upon which there is provided an image. The image 11 is to be cropped to show only the area 12 indicated by an instruction mark/indicia 14 which in the embodiment illustrated is in the form of a square or rectangle drawn using a marker (not shown). The mark 14 is a code and/or instruction which is machine-readable which provides information regarding the desired modification of the image 11. This allows for the automatic reading and implementation of the encoded instruction. The marker contains a marking material that is not visible to the human eye unless viewed under special conditions such as infra red or UV lights. In the embodiment illustrated the marking material is a fluid, and in particular an infra red or UV ink. However any suitable ink, dye and/or pigment may be used. Use of an infra red or UV light causes the mark 14 to be invisible under normal viewing conditions. Using inks, pigments or dyes that are not visible to the unaided eye, but are visible with a special light or inks, pigments or dyes which are visible for a while and then later fade allows the customer to mark his or her personal print without leaving permanent visible marks on the image. Eastman Chemical Company under the trade name N.I.R.F. (near-infrared fluorophore) inks sells appropriate suitable ink for placement of the information.

The method of scanning the hard copy print image with the mark/indicia 14 is such that the image can be separated from the mark/indicia 14 may be accomplished in a variety of ways. One method would use a first scanning pass of the hard copy print 10 to capture the image 11 and an additional second scanning pass to read the mark/indicia 14. The initial scanning would be done using the standard color filtration schemes/combinations known in the art. This could include three passes varying the illumination to read the three color records or using one pass where the sensor was covered with a color filter array. Both of these methods are well known in the art. The additional second pass would use narrow band illumination/filtration around the spectrum of the marking dye. As an example, if the marking device had an IR dye the last pass would either illuminate the print with IR energy in the range of the spectrum relevant to the dye. The sensor in the scanner would be filtered so that it was only exposed to light in that narrow portion of the IR spectrum. Both of the above expect the sensor to be responsive to the portion of the spectrum modulated by the marking dye. In this way the mark/indicia 14 could be distinguished from the hard copy print image 11.

If it is desired that the print 10 only be scanned one time (for example due to time constraints) this could be achieved as well. In a one scan process, a color filter array, already commonly used to scan three color records at one time, could be modified to include an additional filter. Now instead of the typical three different filter types as part of the array there would be four. The fourth filter would be a narrow band pass filter designed to match the spectral characteristics of the marking dye. The arrangement of the different filters on the sensor could be designed to maximize image quality while maintaining enough information in the fourth channel, that of the mark/indicia, to detect and interpret the mark/indicia 14. Design techniques for color filter arrays are well known in the art.

A permanent marking material visible to the human eye may be used if the condition of the original print is of no concern or if the image surface is protected so that the marking material is removal in a manner which is non-destructive of the original print. In the embodiment illustrated in FIG. 1 the mark 14 provided instructions as to the area to be printed. While in the embodiment illustrated the mark 14 is drawn a continuous line, the mark 14 may take other forms, for example, but not by way of limitation, the mark 14 may be in the form of a broken line, such as dashes or line segments. Further the mark may not necessarily be provided in the exact shape of a rectangle, square or other shape. An appropriate algorithm may be provided so that the image is printed in a shape and/or size that best fits the shape designated by mark 14.

Figure 2:
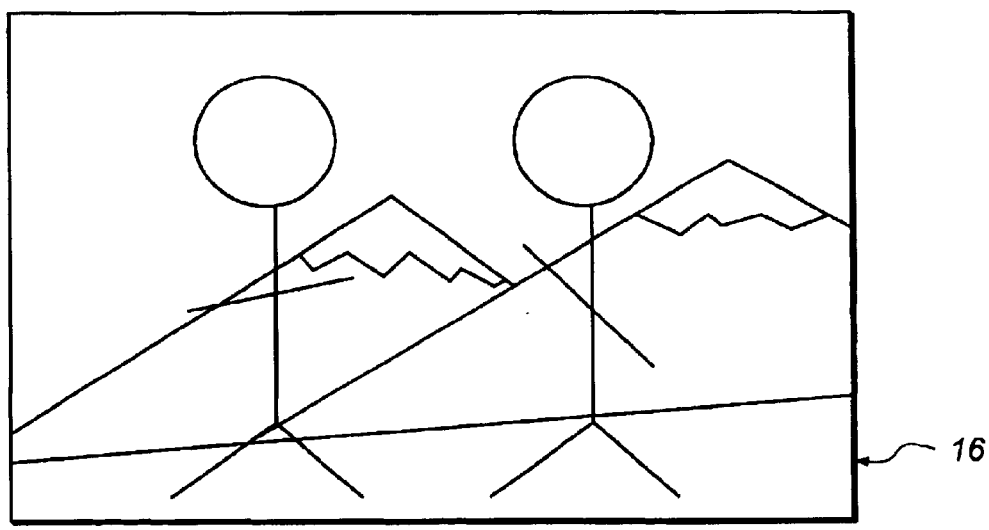
FIG. 2 illustrates a reprint of the area to be cropped that is marked on the hard copy image.
Figure 3A:
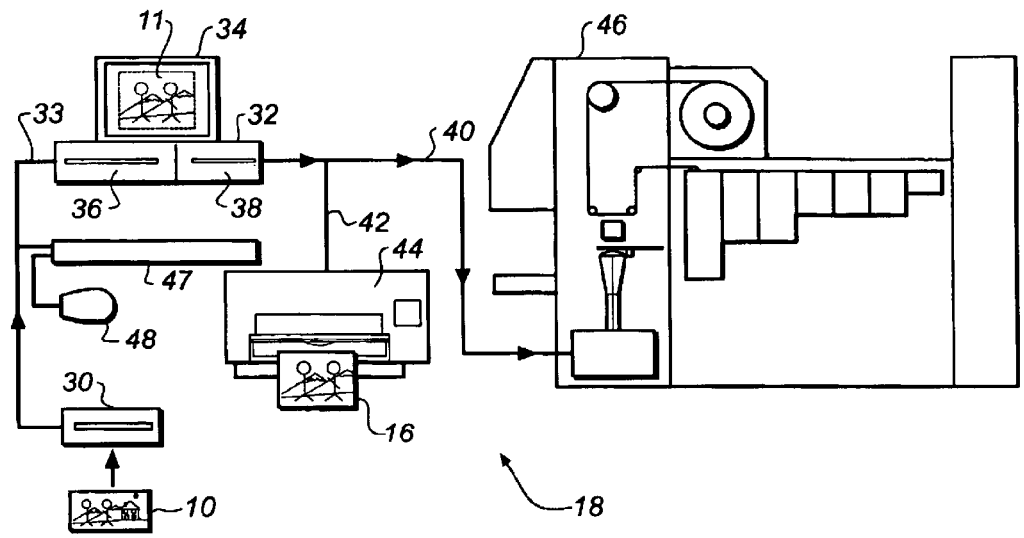
FIG. 3A is a schematic of the apparatus used to produce a digital hard copy reprint from the marked scanned hard copy image.

FIG. 2 illustrates a hard copy print 16 produced using the marked hard copy print 10 of FIG. 1 using the system 18 illustrated in FIG. 3A. As can be seen the size and shape of the hard copy print 16 is slightly different than that identified by mark 14 of FIG. 1. As previously discussed an algorithm is provided for best fitting the identified image to the capabilities of the printing system.

Figure 6:
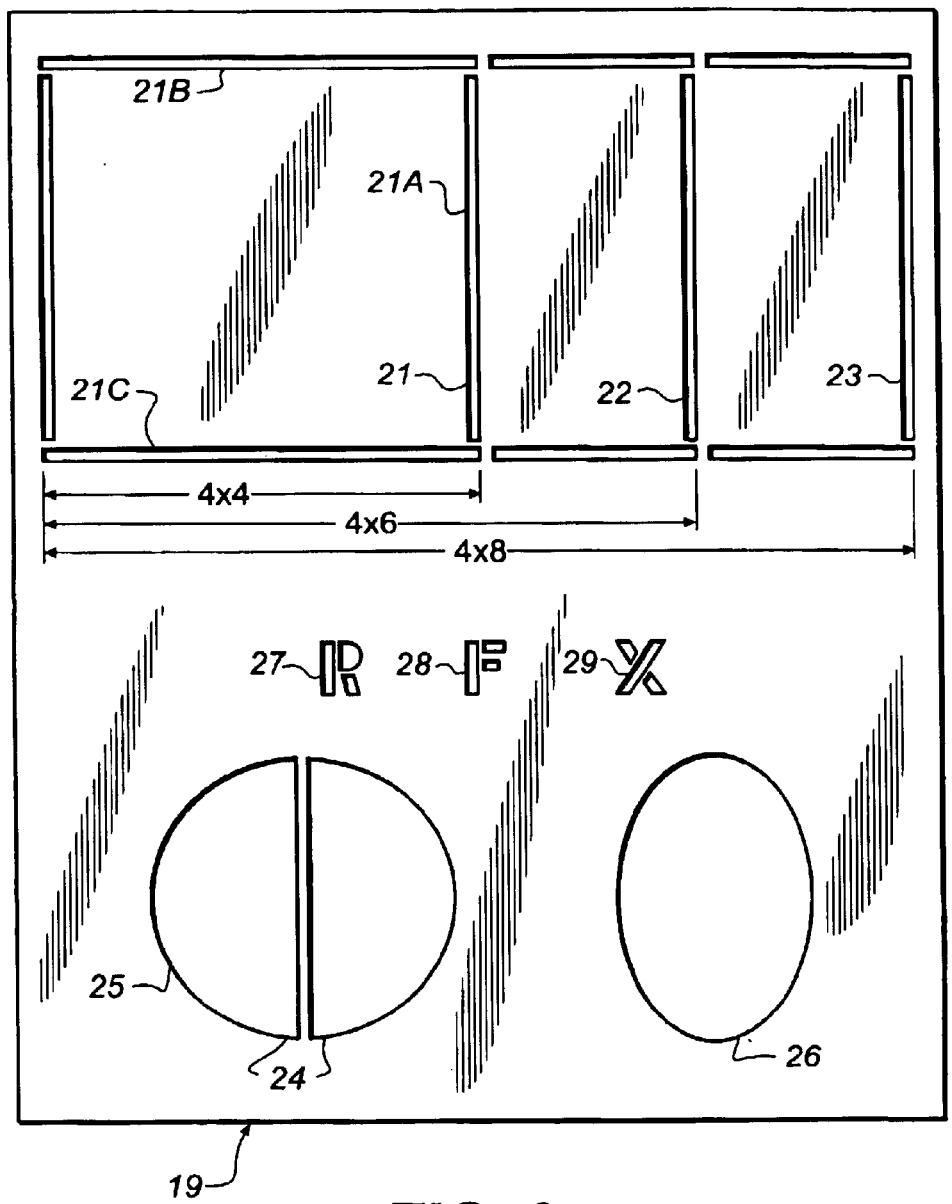
FIG. 6 illustrates a template provided to assist the customer in marking the scanned hard copy image by providing outlined areas which can easily be identified with a particular output size and/or shape and code.

While the mark 14 may be made free hand by the customer, a template 19 as illustrated in FIG. 6 may be provided for assisting the customer in providing outlined areas which can easily be identified with a particular output size and/or shape. For example template 19 comprises a generally planar support structure having at least one cut-out. In the embodiment illustrated the cut-outs comprise openings having rectangular shapes 21, 22, and 23 each being associated with a particular hard copy print format. In particular, shape 21 is associated with a format having a square aspect ratio, shape 22 is associated with a format having a 4 by 6 aspect ratio, and shape 23 has a format having a 4 by 8 aspect ratio. Different size squares and rectangles may be drawn using portions of the openings 21A, 21B, 21C and/or 21D. Template 19 may be provided with any desired size or shape cut-out representing any desired function, format and/or code. In the embodiment illustrated, template 19 is also provided with template openings 24, 25 and 26 having circular, oval and half moon shapes. However, it is to be understood that the template may be provided with any desired shapes. The particular size of the selected shaped may be preprogrammed or selected by the user in any convenient or desired manner. The template 19 may also include letter codes for employing a particular correction to the image 11. For example template 19 has template openings having code 'R' indicated by numeral 27, code 'F' indicated by numeral 28, and code 'X' indicated by the numeral 29. Where 'R' is the code for employing an algorithm for correcting for red eye, 'F' is the code for employing an algorithm for correcting for flesh tone, and 'X' is the code for employing an algorithm for removing the identified area. However, it is to be understood that the template 19 may be provided with any number of codes representing any desired correction to be applied to image 11.

Referring to FIG. 3A there is illustrated a schematic of a system 18 used to produce a digital hard copy print from a marked scanned hard copy print 10. The system 18 includes a scanner 30, such as Hewlett Packard Scanjet IICX color scanner, connected to a (CPU) computer 32 via cable 33 with a monitor 34. The computer 32 includes a memory 36, and logic and control unit 38. The computer 32 is connected via cables 40 and 42 to a pair of digital output devices 44, 46. The computer 32 is provided with the appropriate software(algorithms) for interpreting the digital image data of the image 11 and the instructional indicia 14 obtained by scanner 30 and for implementing the appropriate instructions. In the embodiment illustrated digital output device 44, is a thermal printer such as a Kodak PS 8650 Thermal Color Printer and output device 46 is a digital minilab such as a Gretag Imaging Masterlab 740 Digital with Kodak Digital Printer respectively. Other examples of Digital output devices are the KODAK Large Format CRT Color Printer II and the KODAK CRT Digital Color Printer. The digital output device can also be an inkjet printer such as an Hewlett Packard Deskjet 870xi. Data entry means is provide for allowing entry of instruction into computer 32. The data entry means may comprise any suitable device, for example but not by way of limitation, a key board 47 as illustrated, a computer mouse 48, or any other device that can be used to enter data/instructions to the computer 32. The entry means could be used to identify the type of output device desired to produce the hard copy print or the particular size of the hard copy print leaving the particular area to modified to be identified by mark 14.

Figure 3B:
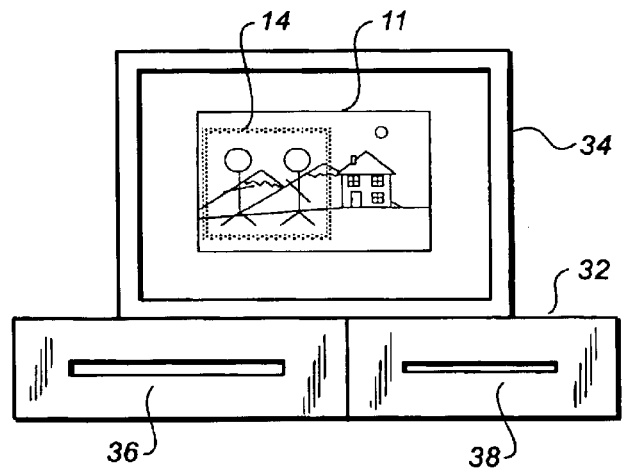
FIG. 3B is an enlargement of the computer monitor 34 shown in FIG. 3A.

After the customer has marked the hard copy image 10, the marked hard copy image 10 is scanned using the scanner 30. Referring now to FIG. 3B, the hard copy image is scanned in such a manner that the image 11 along with the modifying marks 14 now appears on a monitor 34. It is well known in the art that scanners can detect and digitize wavelengths in the range of infra red as well as UV. Using the modification marks 14, an algorithm provided in the computer 32 identifies the areas in the image 11 that are to be modified. Modification instructions may also be entered into system 18 through the use of date entry means. Referring back to FIG. 3A the image 11 is show on monitor 34 as it will appear on the hard copy print 16.

Figure 4:
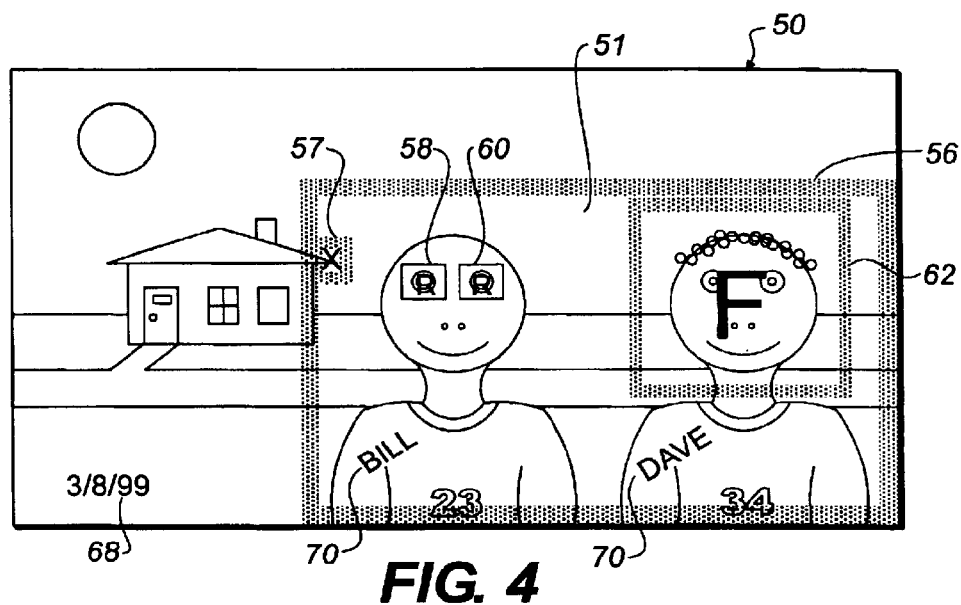
FIG. 4 illustrates a hard copy image with the areas to be modified by the algorithms marked.

It is to be understood that the present invention is not limited simply to cropping of the original image and that any desired modifications may be made to the original image. Referring to FIG. 4 there is illustrated a hard copy print 50 having an image 51 with several areas to be modified which are identified by specific individual marks. The area identified by rectangular mark 56 on the hard copy image 51 identifies that the area that is to be printed in the hard copy reprint 54 (See FIG. 5). In some cases a code letter may be used to identify the type of modification to be made. For example, in certain photographic there occurs a defect wherein the eyes of an individual are red often referred to as "red eye." It is often desirable to have this corrected so that the natural eye color is printed. In the present invention as illustrated by FIG. 4 an area in which red eye is to be corrected is identified by providing a rectangular mark 58 and 60 with the letter "R" written within the mark 58 and 60. Since there are two eyes, two marks 58 and 60 are provided. Additionally, providing a rectangular mark 62 with the letter "F" identifies areas where the flesh tones are to be adjusted. An object to be removed from the hard copy reprint 54 is indicated by the rectangular mark 57 with the letter "X" drawn therein. A preferred embodiment is to have these modifications done automatically by the computer 32 using algorithms. An example of a suitable algorithm is described in U.S. patent application Ser. No. 09/216,900 by David Patton, John Fredlund and Hohn Buhr entitled METHOD AND APPARATUS FOR MODIFYING A PORTION OF AN IMAGE IN ACCORDANCE WITH COLORIMETRIC PARAMATERED filed on Dec. 21, 1998. If the customer desires to have annotation added to the hard copy reprint, he or she can use the marker to identify items and/or texts 68, 70 on the hard copy print 50 they would like added as text 72 to the hard copy reprint 54 shown in FIG. 5. As can be seen, any desired code or marking system may be utilized to identify an area to be modified and the modification to be made thereto. Thus the present invention is not limited to the marking patterns or modifications disclosed.

Figure 5:
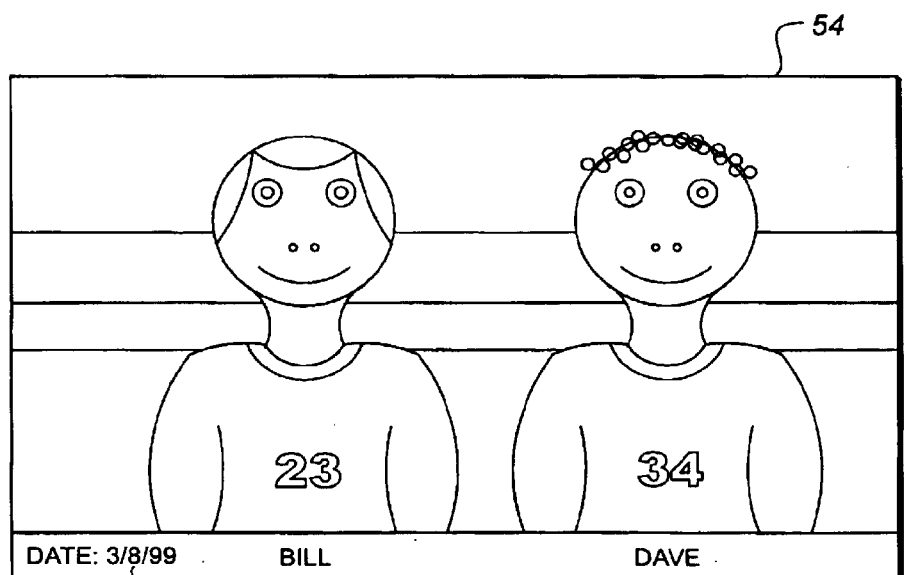
FIG. 5 illustrates a digital hard copy reprint of the marked scanned hard copy image using the apparatus shown in FIG. 3.

Referring to FIG. 5 there is illustrated a digital hard copy reprint 54 produced using the apparatus shown in FIG. 3 in accordance with the modification instructions indicated by the marks on the hard copy image shown in FIG. 4.

While in the preferred embodiment the instructions are automatically entered into the computer by the scanner digitally scanning the image and the computer with appropriate software (algorithms) interprets the encoded instructions, the present invention is not so limited. An operator may look at the marked hard copy print or scanned image on a display device with modification instruction marks and manually initiate the changes to be made in accordance to the desired instructions.

Figure 7:
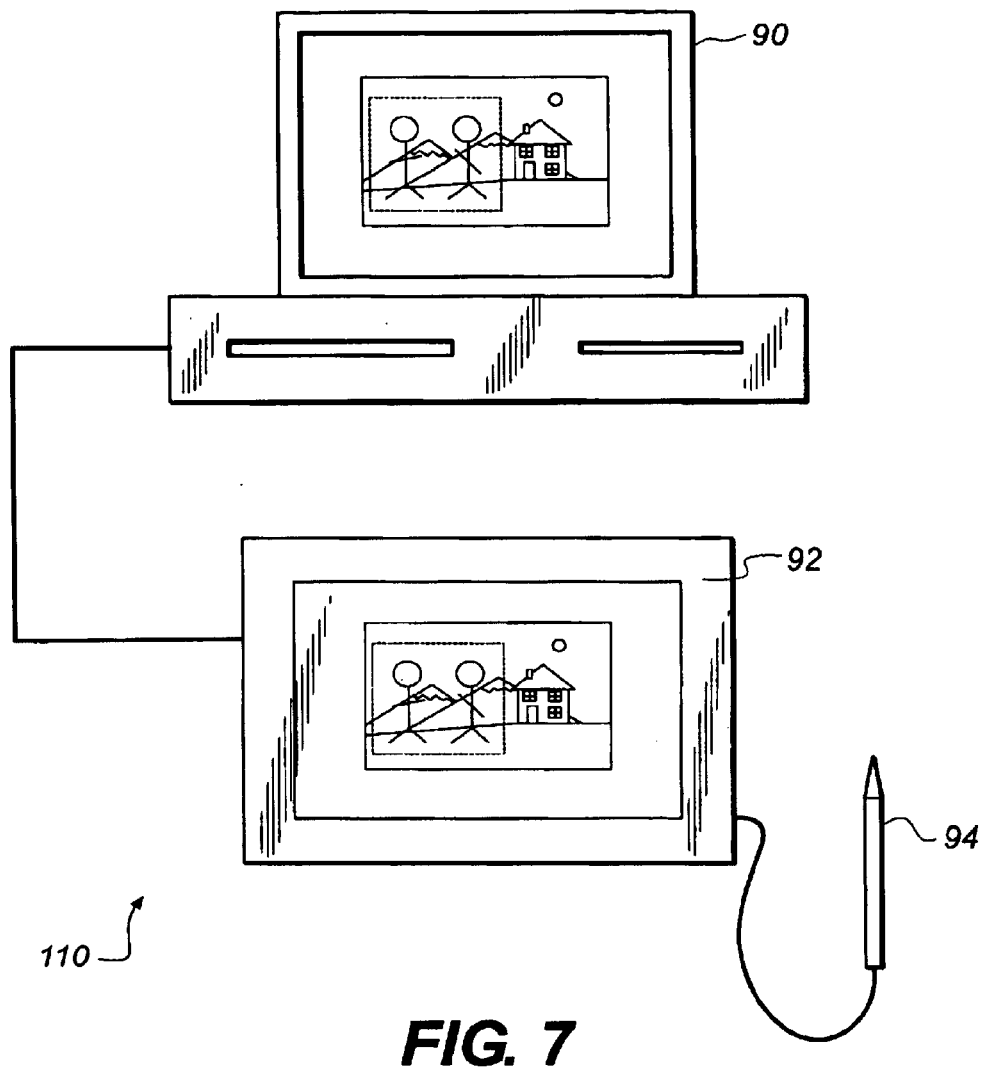
FIG. 7 is a schematic of a digitizing pad and stylus used for entering instructions to the computer.

Referring to FIG. 7 there is illustrated a modified system 110 for entering modification instructions for modifying an image that has been digitally scanned and displayed on a display device 90. System 110 is similar to system 18 like numerals indicating like parts and operation. In this embodiment a digitizing pad 92 and stylus 94 is used for entering instructions to the computer. An example of a suitable pad and stylus is the Graphier cordless pen and mouse set by Wacom. The stylus 94 in conjunction with the pad 92 can be used to identify areas and provide instructional marks on the displayed image. Using the stylus marks can be provided on the image except that the original print is not affected in any manner as the marks are only electronically displayed on the screen. Similar to Photoshop's selection tool, a preselected image modifying mark 14 may be resized or moved by selecting the mark 14 or portion of the mark 14 with the stylus 94 and dragging the mark 14 to the new desired position. Once the user has provided the desired instructions, the order can be formally entered for completion of the print order. In this system there is avoided the need for writing directions on the hard copy print 10 or providing sleeves or a protective coating on the hard copy print 10.

Figure 8:
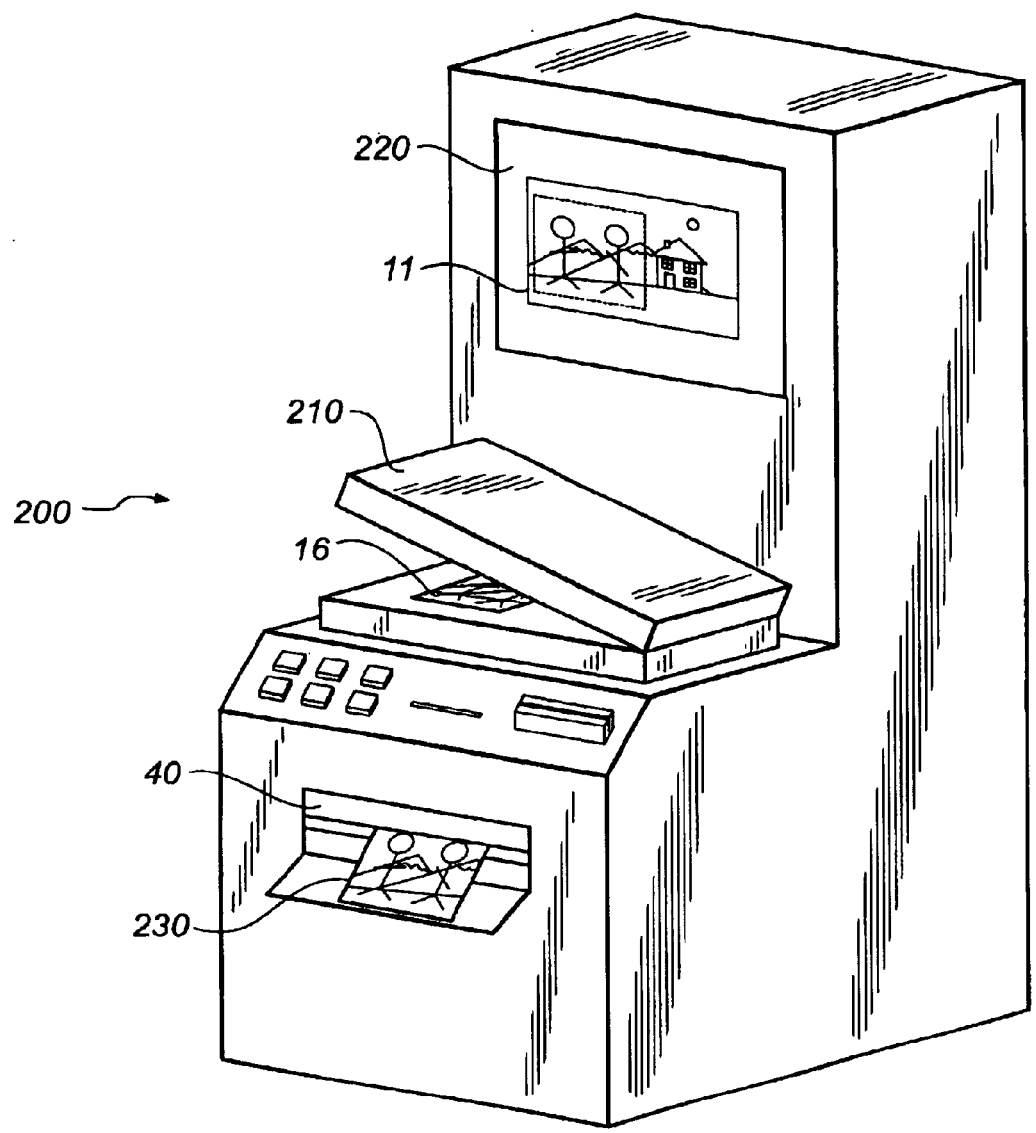
FIG. 8 is a schematic of a kiosk used to produce a digital hard copy reprint from the marked scanned hard copy image.

Referring to FIG. 8 there is a kiosk 200 used to produce a digital hard copy reprint 230 from the marked scanned hard copy image. The kiosk 200 is similar to system 18 like numerals indicating like parts and operation. FIG. 8 illustrates a hard copy print 230 produced using the marked hard copy print 10 of FIG. 1 using kiosk 200. The marked hard copy print 10 with modification instructions for modifying an image is digitally scanned using flatbed scanner 210 provided in kiosk 200 and displayed on a display device 220 provided in kiosk 200. The digital hard copy reprint 230 is produced using thermal printer 240 provided in kiosk 200 such as a Kodak PS 8650 Thermal Color Printer in accordance with the modification instructions indicated by the marks on the hard copy image.

Figure 9A:
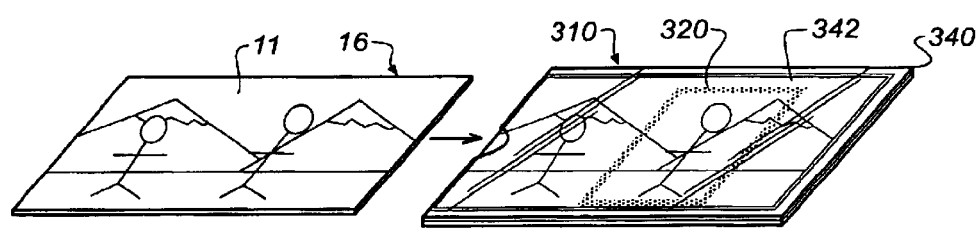
FIG. 9A is a schematic of a print insert into a transparent sleeve on which image modifying are written and scanned.
Figure 9B:
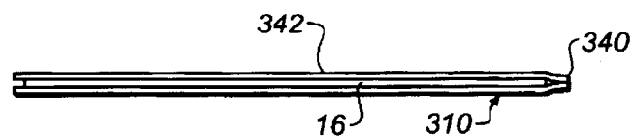
FIG. 9B is a side view of a print insert into a transparent sleeve.

Referring to FIG. 9A there is illustrated a hard copy print 16 inserted into a transparent sleeve 310. The image 11 on the hard copy print 16 is readily visible through the top layer 340 of the transparent sleeve 310 (See side view FIG. 9B). The transparent sleeve 310 allows the user to view the image 11 and to put the image modifying instructions 320 directly onto the top surface 342 of top layer 340 in eye-readable form using a wax marker or other marking device. The user can also use the template 19 as described in FIG. 6. The hard copy print 16, transparent sleeve 310 with image modifying instructions 320 are scanned using system 18 described in FIG. 3 or the kiosk 200 described in FIG. 8. Similar to system 18 and kiosk 200 like numerals indicates like parts and operation.

Figure 10:
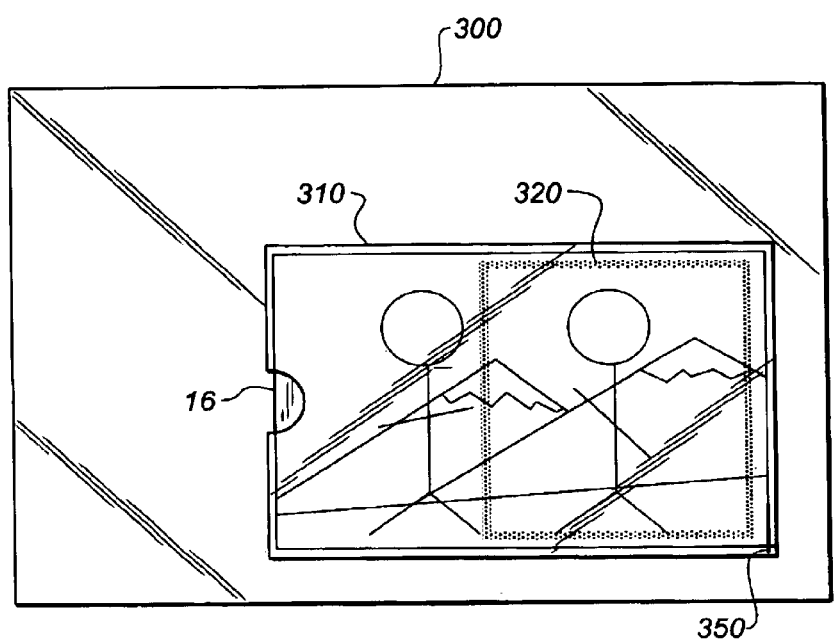
FIG. 10 illustrates a transparent sleeve containing a hard copy print and image modifying instructions that are placed on a scanner platen.

Referring now to FIG. 10, the transparent sleeve 310 containing the hard copy print 16 and image modifying instructions 320 is illustrated placed on a scanner platen 300 of an appropriate scanner (not shown). The corner of the hard copy print 16 (since it can be readily seen through the transparent sleeve 310) is aligned with indicia 350 provided on platen 300. After the hard copy print 16 in transparent sleeve 310 with image modifying instructions 320 is scanned, the hardcopy print is removed from the sleeve and scanned again. The sleeve 310 can be thrown away after use. Alternatively, if appropriate, the top surface 342 can be cleaned so that the sleeve 310 can be used again. In either case the hard copy print 16 is not subjected to any potential damage due to the marks placed on the sleeve. In another embodiment the print 10 may be provided with a protective over coat (layer) which will not absorb the marking material. Preferably, the over coat will not interfere with viewing of the original image and will also allow the marking material to be easily removed, for example by rubbing off with a clean cloth. As in the case with the transparent sleeve, hardcopy print 16 is scanned with and without the image modifying instructions 320. The computer 32 uses the two scans to separate the image modifying instructions 320 from the image 11.

It is to be understood that various other changes may be made without departing from the scope of the present invention, the present invention is defined by the claims set forth herein.

PARTS LIST

| | |
|---|---|
| 10 | hard copy print |
| 11 | image |
| 12 | area |
| 14 | mark/indicia |
| 16 | hard copy print |
| 18 | system |
| 19 | template |
| 21, 22, 23 | rectangular shapes |
| 21A–21D | openings |
| 24, 25, 26 | template openings |
| 27 | code 'RV' |
| 28 | code 'F' |
| 29 | code 'X' |
| 30 | scanner |
| 32 | computer |
| 34 | monitor |

PARTS LIST -continued

| | |
|---|---|
| 36 | memory |
| 38 | control unit |
| 40, 42 | cables |
| 44, 46 | output devices |
| 47 | key board |
| 48 | mouse |
| 50 | hard copy print |
| 51 | image |
| 54 | hard copy reprint |
| 56, 58, 60, 62 | rectangular mark |
| 68, 70 | identifying items and/or texts |
| 72 | text |
| 90 | display device |
| 92 | pad |
| 94 | stylus |
| 110 | system |
| 200 | kiosk |
| 230 | copy reprint |
| 240 | thermal printer |
| 300 | platen |
| 310 | transparent sleeve |
| 320 | modifying instructions |
| 340 | top layer |
| 342 | top surface |
| 350 | indicia |

What is claimed is:

1. A system for editing an image provided on a hard copy print, comprising:
a marking device for placing an instruction indicia on said hard copy print which is non-visible under normal viewing conditions, said instruction indicia providing instructions for modifying said image; and
a scanning device for reading said instruction indicia and said image, said scanning device includes an algorithm for separating said image from said instruction indicia.

2. A system according to claim 1 further comprising a printing device for printing said image in accordance with said instructions provided by said instruction indicia.

3. A system according to claim 1 further comprising a display device for displaying said image as modified in accordance with said instructions provided by said instruction indicia.

4. A system according to claim 2 wherein said system further comprises a display device for illustrating said image as modified in accordance with said instructions prior to printing of said modified image.

5. A system according to claim 4 wherein said modified image is printed in accordance with said instructions.

6. A system according to claim 1 wherein said marking device comprises a marker which uses a UV ink.

7. A system according to claim 1 wherein said marking device comprises a marker which uses and IR ink.

8. A system according to claim 1 wherein said marking device comprises a marker using an ink which fades to transparent over a brief period of time.

9. A system according to claim 1 wherein said hardcopy print has been treated to provide a protective layer over said image.

10. A system according to claim 1 further comprising a data entry device for entering of additional instructions for modifying of said image.

11. A system according to claim 1 further comprising a computer for receiving for output of said scanning device, said computer having an algorithm for analyzing said data from said scanning device such for recognizing said instruction indicia.

12. A system according to claim 11 wherein said computer further comprises an algorithm for implementing said instruction provided by said instruction indicia.

13. A system according to claim 1 wherein said scanning device comprises a single scanning device for scanning image and said instructional indicia in a single pass.

14. A system according to claim 1 wherein said scanning device comprises a first and second scanning device, said first scanning device capable of identifying said image and said second scanning device capable of recognizing said instructional indicia.

15. A system according to claim 1 further comprising a template for use in providing said instruction indicia on said hard copy print.

16. A system according to claim 1 wherein said system comprises a keyboard for communicating with an output device for fulfilling of said instructions.

17. A system according to claim 1 wherein hard copy print further comprising a protected barrier for placement on said hard copy print upon which said instruction indicia may be provided.

18. A system according to claim 1 wherein said system further comprises a kiosk comprises a supporting platen upon which said hard copy print may be placed and a protective barrier which can be placed over said image upon which said instruction indicia may be provided, said cover having orientation marks, said scanner capable of scanning said image and marking thereon.

19. A system for editing an image provided on a hard copy print, comprising:
  a marking device for placing an instruction indicia on said hard copy print which is non-destructive to said hard copy print, said instruction indicia identifying instructions for modifying said image;
  a scanner for scanning said instruction indicia and said image so as to obtain digital data of said image and said instructional indicia; and
  a discrimination device for identifying said digital image data of said image from said instructional indicia.

20. A system according to claim 19 wherein said discriminating device comprises a computer and an algorithm for analyzing said digital data.

21. A system according to claim 19 wherein said hard copy print comprises a protective layer over said image capable of receiving said instructional indicia without substantially affecting said image and which allows the instructional indicia to be easily removed.

22. A system for editing an image provided on a hard copy print, comprising:
  a sleeve for holding said hard copy print, said sleeve being constructed so as to allow said image on said hard copy print to be scanned for obtaining a digital record of said image;
  a marking device for placing an instruction indicia on said sleeve for identifying instructions for modifying said image;
  a scanner for scanning said instruction indicia and said image on said hard copy print so as to obtain digital data of said image and instruction indicia; a discrimination device for identifying said digital image data of said image from said instructional indicia.

23. A method for editing an image on a hard copy print, comprising the steps of:
  a) providing an instruction indicia on said hard copy print which is not visible under normal viewing conditions, said instruction indicia comprising instructions for modifying of said image; and
  b) scanning said hard copy print so as to read said instruction indicia and obtain digital image data representative of said image, said digital image data and said instructions are obtained by a single scanning step.

24. A method according to claim 23 further comprising the step of printing or displaying said image as modified in accordance with said instruction provided by said instruction indicia.

25. A method according to claim 23 further comprising the steps of providing an algorithm for separating said digital image data from said instruction indicia.

26. A method according to claim 23 further comprising the steps of providing additional instructions using a data entry device.

27. A template for use in providing instruction indicia provided on a hard copy print having an image using a marker, said template comprising:
  a generally planar support structure having at least one cut-out for use in placing an indicia of-a predetermined configuration, said indicia comprises a code that identifies a particular function for modifying said image.

28. A template according to claim 27 wherein said indicia comprise a cutout.

29. A system for editing an image provided on a hard copy print, comprising:
  a marking device for placing an instruction indicia on said hard copy print which is non-visible under normal viewing conditions, said instruction indicia providing instructions for modifying said image, said marking device comprises a marker using an ink which fades to transparent over a brief period of time;
  a scanning device for reading said instruction indicia and said image; and
  an algorithm for differentiating between said instructional indicia and said image.

30. A system for editing an image provided on a hard copy print, comprising:
  a marking device for placing an instruction indicia on said hard copy print which is non-visible under normal viewing conditions, said instruction indicia providing instructions for modifying said image, said hard copy print has been treated to provide a protective layer over said image;
  a scanning device for reading said instruction indicia and said image; and
  an algorithm for differentiating between said instructional indicia and said image.

31. A system for editing an image provided on a hard copy print, comprising:
  a marking device for placing an instruction indicia on said hard copy print which is non-visible under normal viewing conditions, said instruction indicia providing instructions for modifying said image; and
  a scanning device for reading said instruction indicia and said image, said scanning device comprises a single scanning device for scanning said image and said instruction indicia in a single pass.

32. A system for editing an image provided on a hard copy print, comprising:
  a marking device for placing an instruction indicia on said hard copy print which is non-visible under normal viewing conditions, said instruction indicia providing instructions for modifying said image; and
  a scanning device for reading said instruction indicia and said image, said scanning device comprises a first and second scanning devices, said first scanning device capable of identifying said image and said second scanning device capable of recognizing said instruction indicia.

33. A system for editing an image provided on a hard copy print, comprising:
   a marking device for placing an instruction indicia on said hard copy print which is non-visible under normal viewing conditions, said instruction indicia providing instructions for modifying said image;
   a scanning device for reading said instruction indicia and said image;
   a template for use in providing said instruction indicia on said hard copy print; and
   an algorithm for separating said instructional indicia from said image.

34. A system according to claim 33 wherein said template comprises means for placing predetermined shapes and or codes on said hard copy print.

35. A system for editing an image provided on a hard copy print, comprising:
   a marking device for placing an instruction indicia on said hard copy print which is non-visible under normal viewing conditions, said instruction indicia providing instructions for modifying said image, said hard copy print further comprising a protective barrier for placement on said hard copy print upon which said instruction indicia may be provided; and
   a scanning device for reading said instruction indicia and said image.

36. A system according to claim 35 wherein said protected barrier comprises a sleeve.

37. A system for editing an image provided on a hard copy print, comprising:
   a marking device for placing an instruction indicia on said hard copy print which is non-visible under normal viewing conditions, said instruction indicia providing instructions for modifying said image;
   a scanning device for reading said instruction indicia and said image; and
   a kiosk having a supporting platen upon which said hard copy print may be placed and a protective barrier which can be placed over said image upon which said instruction indicia may be provided, said cover having orientation marks, said scanner capable of scanning said image and marking thereon.

38. A method for editing an image provided on a hard copy print, comprising the steps of:
   providing an instruction indicia on said hard copy print which is not visible under normal viewing conditions, said instruction indicia comprising instructions for modifying of said image;
   scanning said hard copy print so as to read said instruction indicia and obtain digital image data representative of said image; and
   providing additional instructions using a data entry device.

39. A method for editing an image provided on a hard copy print, comprising the steps of:
   providing an instruction indicia on said hard copy print which is not visible under normal viewing conditions, said instruction indicia comprising instructions for modifying of said image;
   scanning said hard copy print so as to read said instruction indicia and obtain digital image data representative of said image in a single step; and
   differentiating said instructional indicia from said image.

40. A method for editing an image provided on a hard copy print, comprising the steps of:
   providing an instruction indicia on said hard copy print which is not visible under normal viewing conditions, said instruction indicia comprising instructions for modifying of said image;
   scanning said hard copy print so as to read said instruction indicia and obtain digital image data representative of said image; wherein scanning comprises the use of two separate scanners.

41. A method for editing an image provided on a hard copy print, comprising the steps of:
   providing an instruction indicia on said hard copy print which is not visible under normal viewing conditions, said instruction indicia comprising instructions for modifying of said image;
   scanning said hard copy print so as to read said instruction indicia and obtain digital image data representative of said image; wherein
   scanning comprises the step of scanning said hard copy image twice wherein said image is obtained by scanning said hard copy image in two steps.

* * * * *